H. M. MARBLE.
DIAPHRAGM MOUNTING.
APPLICATION FILED SEPT. 11, 1914.
1,242,222.
Patented Oct. 9, 1917.
2 SHEETS—SHEET 1.
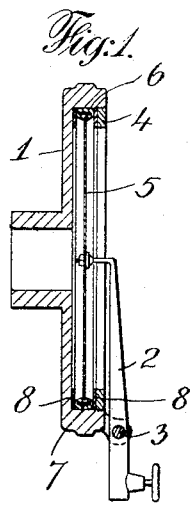
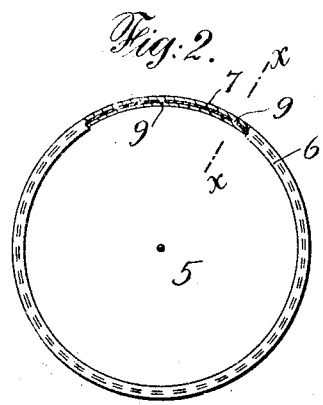
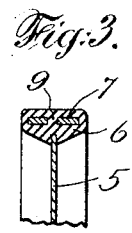
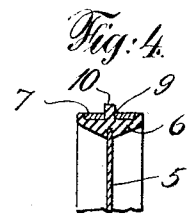
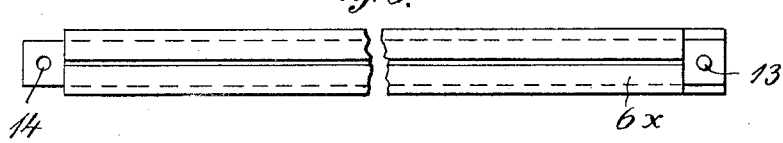
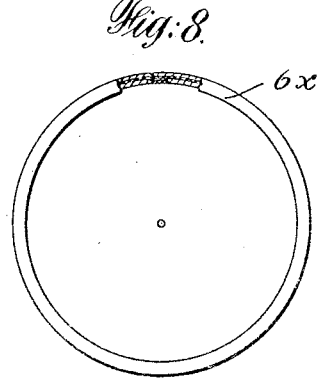
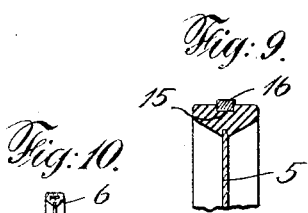
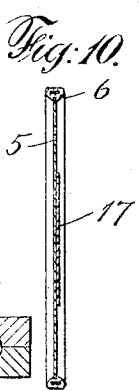
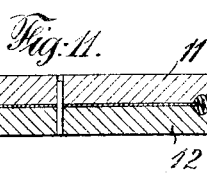
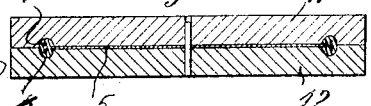
Witnesses:
Max B. A. Doring
Paul H. Franke
Inventor
Harry M. Marble

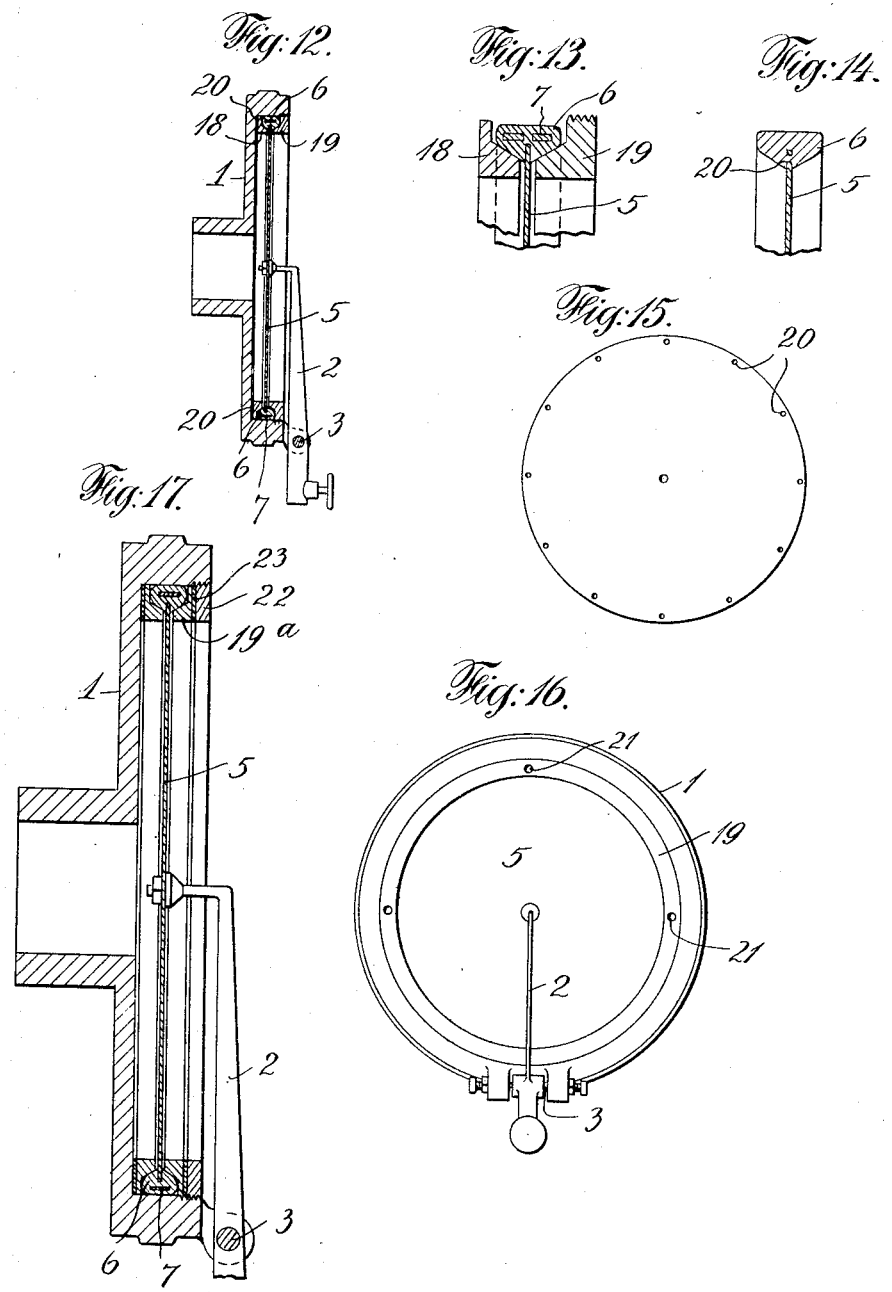

UNITED STATES PATENT OFFICE.

HARRY M. MARBLE, OF NEWARK, NEW JERSEY, ASSIGNOR TO MAGNETIC PHONOGRAPH COMPANY, OF NEW YORK, N. Y., A CORPORATION OF NEW YORK.

DIAPHRAGM-MOUNTING.

1,242,222.   Specification of Letters Patent.   Patented Oct. 9, 1917.

Application filed September 11, 1914. Serial No. 861,305.

*To all whom it may concern:*

Be it known that I, HARRY M. MARBLE, a citizen of the United States of America, and a resident of Newark, in the county of Essex and State of New Jersey, have invented certain new and useful Improvements in Diaphragm-Mountings, of which the following is a specification.

My invention relates to mountings for the diaphragms of phonographs, telephones, etc., and comprises means whereby the diaphragm is held very firmly at its edge, so avoiding the distressing sounds due to looseness of the diaphragm, and yet is remarkably free for flexure such as required by the normal vibration of the diaphragm. My invention also comprises means whereby compression of the elastic or yielding material holding the diaphragm is avoided, and whereby such material is held in engagement with the diaphragm. Other features of my invention will be pointed out hereinafter.

The objects of my invention are to obtain a more mellow and "round" or "full" tone; to permit very free vibration of the diaphragm while avoiding the effects characteristic of loose diaphragms; to avoid false sounds due to play between the diaphragm mounting and the sides of the sound box or case; to make impossible material compression of the material holding the diaphragm; and to provide a diaphragm mounting which, while possessing the above desirable qualities, is simple and inexpensive in construction.

I will now proceed to describe my invention with reference to the accompanying drawings and will then point out the novel features in claims. In the drawings:

Figure 1 shows a transverse section of a typical phonograph sound box, containing a diaphragm mounted in accordance with my invention.

Fig. 2 shows a front view and partial section of a diaphragm and mounting embodying my invention.

Fig. 3 shows on a larger scale a detail transverse section on the line $x$—$x$ of Fig. 2.

Fig. 4 is a view similar to Fig. 3, but shows an alternative construction.

Fig. 5 is a detail side view of the reinforcing and spacing ring which I employ, in some constructions.

Fig. 6 shows a side view and Fig. 7 an end view of a diaphragm mounting strip which may be employed according to my invention.

Fig. 8 shows a face view of a diaphragm with such mounting strip thereon.

Fig. 9 is a view similar to Figs. 3 and 4, but shows a further alternative diaphragm mounting.

Fig. 10 is a further face view of a diaphragm and mounting, illustrating the application, to a diaphragm of non-magnetic material, of a central portion of magnetic material.

Fig. 11 shows a transverse section of a mold or die such as may be used in forming the mounting ring, as hereinafter described, or in the vulcanization or other heating, or pressure, or heating and pressure, treatment, a diaphragm being shown in place within such mold or die.

Fig. 12 shows a transverse section of a typical phonograph sound box, and illustrates alternative means for holding within that sound box a diaphragm having a mounting ring such as above referred to, and for putting that diaphragm under tension if so desired.

Fig. 13 is a fragmentary sectional view on a larger scale, of a portion of the diaphragm with its mounting ring and the coacting clamping rings.

Fig. 14 shows a fragmentary transverse section on an enlarged scale, of an alternative form of mounting ring and diaphragm.

Fig. 15 shows a face view of the edge-perforated diaphragm employed in the Fig. 14 construction and Fig. 16 shows a front view of the box shown in Fig. 12.

Fig. 17 is a transverse section of a sound box on an enlarged scale, illustrating alternative means for advancing the movable wedge ring.

It is well known to those who have experimented in the endeavor to improve phonographic recording and reproduction of sound, that the manner in which the diaphragm of a recorder or reproducer is held, has much to do with the quality of sounds recorded or reproduced. The diaphragms of phonograph recorders are frequently held at their edges, within a metallic case, by a thin band of wax holding the diaphragm against the case much as, in an ordinary window frame, the window panes are held in the frame by putty; though occasionally recorder diaphragms are mounted otherwise.

In the case of phonograph reproducers or so-called "sound-boxes" the diaphragms are commonly held between rubber gaskets; though it has been proposed, without much success, so far as I am informed, to hold the diaphragm by a molded rubber ring having on its inner side a groove receiving the edge of the diaphragm, the ring itself being clamped in the case at points well outside of the edge of the diaphragm. In the use of this latter construction, according to my experience, at times a peculiar fluttering sound is noticed, due undoubtedly to excessive freedom of the diaphragm at its edges. It is well known to those who have had experience with the more familiar constructions, wherein the diaphragm is clamped between gaskets, that it is practically impossible to hold the diaphragm between such gaskets with sufficient pressure to eliminate sounds due to a loose diaphragm, without exerting such compression on the diaphragm as materially "kills" its tone, making the sounds dull; dead; and without natural resonance. Furthermore, a considerable amount of skill is required in the assembling of sound boxes wherein the diaphragm is clamped between gaskets; viz:—skill in regulating to the proper degree, the compression of the gaskets, so as to obtain as free and resonant tone as possible without too much of the disturbance characteristic of a loose diaphragm.

According to my present invention I mold to the edge of the diaphragm a mounting ring, which engages and adheres firmly to the diaphragm in a narrow zone at the extreme edge of the diaphragm—the said mounting ring usually overlapping and adhering to such diaphragm for a width of one sixty-fourth to one thirty-second of an inch from the edge of the diaphragm.

Rubber appears to be the best material from which to make this mounting ring, though I have obtained very good results from mounting rings made of fairly hard wax, such for example as the wax of phonograph cylinders; which wax, though hard at ordinary atmospheric temperatures, still is slightly yielding, though not as yielding as rubber. I have even obtained very good results from mounting rings made of lead alloys, such as Babbitt metal, type metal, etc. In all cases the mounting ring adheres to the surface of the diaphragm, holding the same without a trace of play between the diaphragm and the mounting ring; yet, particularly in the case of the rubber mounting ring, the diaphragm is absolutely free to flex to its extreme edge. I commonly provide within the rubber mounting ring, but spaced away from the edge of the diaphragm, a reinforcing ring, of metal or other suitable material, which takes the thrust of the clamping members between which the mounting ring is held, precluding any material compression of the rubber, while at the same time holding the rubber to the edge portion of the diaphragm and precluding any action which might otherwise tend to break the adhesion of the rubber to the diaphragm, and also precluding all "fluttering" of the diaphragm.

Sound boxes containing diaphragms so mounted in rubber mounting rings have a notably more resonant, full and round tone than do sound boxes wherein the diaphragm is mounted between gaskets; there is absolutely no evidence of looseness of the diaphragm; the volume of tone obtained is at least as great, under equal conditions, as that obtained when the diaphragm is mounted between gaskets holding that diaphragm rather loosely; and it is absolutely impossible for the user of the sound box to spoil the tone of the sound box by undue compression of the rubber.

Referring now to the accompanying drawings, and at first to Figs. 1–5 inclusive, numeral 1 designates the case of a typical phonograph reproducer or sound box, numeral 2 the vibrating stylus or needle-lever of the box, pivoted at 3, and 4 a clamping ring screw threaded to the inner surface of the case 1 and serving to hold the diaphragm and its mounting in place. 5 designates the diaphragm itself. This diaphragm may be of mica (the material commonly employed for phonograph diaphragms) or celluloid or material of like physical properties, or gelatin, or viscose or like material derived from cellulose, or cellulose acetate, or paper, (preferably varnished or otherwise coated to make it impervious to air or moisture;) or celluloid, paper, gelatin, viscose, etc., having secured to it a more rigid material, such as mica, glass, or metal, so forming what is termed in the art a "piston diaphragm"; or glass, or thin sheet metal, such for example as thin sheet iron, thin sheet aluminum, thin sheet magnesium, etc.; or any other suitable somewhat flexible material. 6 designates the mounting ring, which may be of rubber, or wax, or other non-resonant and preferably at least slightly yielding material; though as above stated, I have obtained very good results from rigid mounting rings 6 of low melting metal, such as Babbitt metal or type metal, and regard such metal mounting ring as within my invention. 7 designates the reinforcing or binding ring of unyielding material, above referred to, embedded within the material 6, and preferably spaced away from the edge of the diaphragm; which reinforcing ring is commonly employed only when the material 6 is rubber or soft wax or some other material which yields materially to moderate pressure at ordinary atmospheric temperatures. 8—8 designate suitable gaskets, of paper, thin rubber, or other suitable material, interposed between the mounting ring 6 and the bottom of the case, on the one hand, and the clamping ring 4, on the other hand. However, these gaskets 8 are not material, and may be omitted in many cases, particularly when the material 6 is fairly elastic rubber. By the term rubber as used herein, I mean to include, of course, the ordinary commercial rubber compounds, which often contain considerable mineral matter and "shoddy" as well as other materials, and are capable of vulcanization.

As indicated particularly in Fig. 3, the reinforcing ring 7 may be surrounded completely by the material 6, the thickness of the material 6 outside of the edges of the ring 7 being, preferably, slight, so that compression of such edge portions of the material 6 may not affect materially that portion of the material 6 within which the diaphragm 5 is gripped. As indicated particularly in Fig. 3, and Fig. 5, the ring 7 is preferably provided with a series of perforations 9 whereby the portions of the material 6 on the two sides of this ring 7 are united internally, as well as at the edges. Or, as illustrated in Fig. 4, the main body of the material 6 may extend only to the back of the ring 7, portions of the material 6 extending through the holes 9 of ring 7 forming buffer-projections 10 adapted to contact with the side of the case 1 so as to prevent contact of the ring 7 with the side of the case. Both in the construction shown in Fig. 3, and in the construction shown in Fig. 4, only the material 6 of the mounting ring can come in contact with the side of the case 1, and therefore there can be no rattling due to contact of a metal portion of the mounting with the sides of the case 1.

As will be seen with reference to Figs. 3 and 4, (which show the parts greatly enlarged), the engagement of the material 6 with the edge portion of the diaphragm 5, (particularly when the diaphragm is of mica, glass or steel or other high resilient material) is in an extremely narrow zone, a zone which, in practice, is from one sixty-fourth to one thirty-second of an inch from the outside of the diaphragm inward. The mounting ring is readily applied to the diaphragm by molding, an ordinary two part mold being commonly used. When the material 6 of the mounting ring is of rubber, the grooves of the two sides of the mold, corresponding to the mounting ring, are filled with suitable unvulcanized rubber, or rubber composition or the like, the reinforcing ring 7 is pressed into the rubber composition in one side of the mold, the diaphragm 5 is placed within the mold and properly centered, and then the two parts of the mold are placed together and by pressure, and by heat such as required for vulcanization of the rubber compound, the rubber is united with the diaphragm and with the ring 7, and the two parts of the rubber are united into one integral whole. The heat of vulcanization is not sufficient to injure a diaphragm of mica, glass, cellulose acetate, viscose, paper, metal and various other flexible materials. When the material 6 is wax or material of a waxy nature, the wax may be melted and poured into the mold already containing the diaphragm and the reinforcing ring 7 (if that reinforcing ring is to be employed); or the grooves of the mold, corresponding to the mounting ring, may be filled with the wax in a plastic condition (such wax having been rendered plastic by slight heat) the diaphragm and reinforcing ring 7 (if the latter be employed) being then placed within one part of the mold, and the two parts of the mold being joined, and, by pressure, and (if required) by slight application of heat, the wax is united to the diaphragm and ring 7, and the two parts of wax are united into one integral whole. In this way a celluloid diaphragm having a wax mounting ring may be produced readily, the heat required to soften most of the waxes not being sufficient to injure the celluloid.

Fig. 11 shows a mold or die such as above referred to, 11 and 12 designating the two parts of the mold or die, 5 designating the diaphragm and 6 designating the material of the mounting ring and 7 the reinforcing ring within the mold.

Or, as illustrated in Figs. 6, 7 and 8, the mounting ring may be formed in the first instance as a grooved strip 6$^x$ and the reinforcing ring (if employed) may be embedded in this strip as a straight strip 7$^x$. Such a grooved strip as 6$^x$ is readily formed of rubber or wax or like plastic material, by well known methods. The strip thus prepared may then be wrapped around the diaphragm, the edge of the diaphragm fitting within the groove of the strip. If the material 6$^x$ of such strip be of rubber, the strip will then be placed within a mold and vulcanized. If the material 6$^x$ be of wax the diaphragm with such strip upon it is preferably placed in the mold, or pressure die, and by pressure, aided, if required, by slight heat, the wax is united to the diaphragm and the two ends of the wax strip joined together. When a reinforcing strip 7$^x$ is provided in the strip 6$^x$ suitable means may be provided for locking together the ends of the strips 7$^x$: for example, the two ends of the strips 7$^x$ may be provided, one with a pin 13 and the other with a hole 14 to receive such pin. After the pin 13 is engaged with the hole 14 a drop of solder applied at the joint will fasten the parts securely; and then, if desired, rubber cement may be applied at the joint to cover the exposed metal.

However, I do not limit myself to the use of a reinforcing member 7 within the material 6, and in Fig. 9 I have shown a construction wherein such reinforcing material is omitted. When the material of the mounting ring is relatively hard (for example, when it is relatively hard wax, or metal) I prefer to provide in the outside of this ring, a groove 15, as illustrated in Fig. 9, and to insert in this groove a ring 16 of cushioning material, such for example as rubber, felt or cord, which cushioning ring will be the portion of the mounting to contact with the sides of the box or case 1, and will preclude any noise due to such contact.

Telephone transmitter diaphragms may be mounted in all respects as are the diaphragms of phonograph recorders and reproducers; and it is entirely practicable, in a telephone transmitter, to employ a diaphragm of non-magnetic material; for example, celluloid, gelatin, viscose, cellulose acetate, paper, glass, mica, aluminum, etc. Telephone receiver diaphragms must, ordinarily, be provided with a layer of magnetic material, if not constructed wholly of magnetic material. In Fig. 10 I have illustrated such a construction, wherein the main diaphragm, designated by numeral 5, as in Fig. 1, and provided with a mounting ring as shown in Fig. 1, has cemented to it, or otherwise secured to it, a thin disk of magnetic material, 17. A material gain in clarity of articulation by telephone receivers may be obtained by means of the construction shown in Fig. 10, the main diaphragm being of some relatively flexible material, such for example as celluloid, paper, viscose, or cellulose acetate.

Sometimes I form the main diaphragms for phonograph recorders and reproducers and telephone transmitters, etc., of quite flexible material such as celluloid, viscose, cellulose acetate, gelatin or paper, cementing to such main diaphragm a smaller plate of more rigid material, such as mica, glass, aluminum or magnesium, as illustrated in Fig. 10, so forming what is known as a "piston diaphragm."

I am aware that it has been proposed heretofore to secure a diaphragm of mica or the like to a massive mounting ring of non-yielding material by a thin layer of rubber cement engaging the edge only of the diaphragm. Such construction does not possess the advantages of the diaphragm mounting herein illustrated and described. The elasticity of the cement referred to is an uncertain quantity, particularly after it has aged; it does not hold the diaphragm securely and the mounting of the diaphragm in said cement requires extreme skill. The various mounting ring constructions embodied in my invention require only relatively unskilled labor, and the diaphragms so mounted may be produced at low cost; and when so produced they may be assembled with the other parts of the sound box structure with much greater facility than attends the assembling of the parts of the former sound box structure.

The adhesion of the various types of mounting rings referred to herein as embodying my invention, to the diaphragms, is thereby distinguished from the adhesion produced by merely cementing a rubber gasket or mounting ring to a diaphragm, as is done sometimes. In all of the various embodiments of my invention, the material of the mounting ring, at some time during the process of applying that material to the diaphragm, is under considerable pressure at a time when the material is undergoing an internal change. Thus, when the material of the mounting ring is rubber, that rubber is under pressure during the vulcanization period; when the material of the mounting ring is wax, that wax is under pressure during the solidification of the wax (if the wax be cast in the mold) or during the pressing of the wax (if the wax be united to the diaphragm by pressure as above described). And when the material of the mounting ring is cast metal, that material is under internal pressure due to contraction, while solidifying. As a result, the internal stresses of the material of the mounting ring are such as to tend to hold that material to the diaphragm; producing an adhesion stronger than that due to mere intimate contact. Moreover, when cement is employed to secure adhesion of a mounting ring to the diaphragm, a layer of this cement is necessarily pressed between the material of the mounting ring and the diaphragm, and the elasticity of this cement layer is an uncertain quantity, particularly after it has aged; also cement is very apt to lose its adhesion to very smooth and hard materials, such as mica.

In some cases instead of holding the diaphragm, by means of its mounting ring, between clamping members acting upon the edge of that mounting ring, as shown in Fig. 1, I provide holding members engaging the inner surface of such mounting ring and in some cases I put the diaphragm and its mounting ring under tension, by means of such holding members. This construction is illustrated in Figs. 12–16 inclusive. The diaphragm and its mounting ring may be in all respects the same as in the constructions previously illustrated and described, but the case is provided with two wedge-rings, 18 and 19, one of which may rest loosely within the box, being separated therefrom by a gasket 20, the other being so mounted (as for example by screw threads engaging corresponding threads in the side of the box) that it may be moved toward and from the diaphragm. It will be seen that by moving such movable ring 19 toward the diaphragm the mounting ring 6 is clamped firmly between the wedge rings 18 and 19; and if the material of the mounting ring be at all yielding in its nature, further slight movement of the clamping ring 19 toward the diaphragm will place that clamping ring under tension, which may be regulated by moving the ring 19 nearer to or farther away from the diaphragm. It will also be seen that, by so placing the mounting ring under tension, the diaphragm itself, if of material which is at all extensible, is also placed under tension. This ability to place the diaphragm itself under tension is extremely desirable, when that diaphragm is formed of material such as celluloid, viscose, cellulose acetate, gelatin, paper, or thin sheet metal; for a slightly taut diaphragm gives a far clearer, fuller, and rounder tone than does a flabby diaphragm.

I am aware that heretofore various constructions have been proposed, whereby diaphragms of more or less extensible material may be drawn taut; but the particular type of clamping arrangement shown in Figs. 12 and 13 permits the use of a larger diaphragm, within given dimensions of sound box, than any other diaphragm tensioning device of which I am aware; and also is very simple, inexpensive, and easy to adjust, and so holds the diaphragm and its mounting ring that very free vibration of the diaphragm is permitted; such compression of the material of the mounting ring as exists being in a direction radially outward, with respect to the diaphragm, so that such compression does not interfere in the slightest degree with free vibration of the diaphragm.

In the arrangement shown in Figs. 12-16 inclusive and other like arrangements for placing under tension a diaphragm having a mounting ring constructed in accordance with my invention, or for placing under a tension the mounting ring itself, the reinforcing ring 7 may or may not be used, as preferred. In Figs. 12 and 13 I have illustrated the mounting ring as provided with such reinforcing ring 7; while in Fig. 14 I have shown the mounting ring as omitted.

I have found that the material of mounting rings applied to diaphragms as above described, adheres to such diaphragm so tightly that the mounting ring may be placed under considerable tension, so as to stretch the diaphragm materially, without breaking the adhesion between the mounting ring and the diaphragm; but to absolutely prevent any separation of the mounting ring from the diaphragm, the latter may be provided with perforations 20 near its edges, as illustrated in Figs. 14 and 15, in which case the material of the mounting ring will interlock with such perforations. In the construction shown in Figs. 12 and 13, wherein the clamping ring 19 is screw connected to the box or case 1. said ring 19 may be provided with recesses 21, for engagement of such ring by a suitable key or spanner, for convenience in screwing such ring 19 in or out; or any other convenient means may be provided for rotating such ring 19.

As illustrated in Fig. 17, the movable wedge ring, designated in such figure by numeral 19ª, instead of being itself screw threaded may be pressed forward by a further ring 22, itself screw threaded to the box. This construction avoids rotation of the ring 19. In such case there is, preferably, a thin washer of paper 23 or the like between rings 19ª and 22.

The particular type of acoustic device in which diaphragms having mountings embodying my invention are employed, is relatively unimportant; and my invention is applicable, generally, to all locations in which flexible diaphragms are employed; therefore I do not limit myself to the application of my invention to phonograph sound boxes, telephone transmitters and receivers, etc.

What I claim is:—

1. As an article of manufacture, a diaphragm of flexible material surrounded at its edge by a mounting ring of at least slightly yielding nature, having within it a reinforcing ring of relatively rigid material.

2. As an article of manufacture, a diaphragm of flexible material surrounded at its edge by a mounting ring of at least slightly yielding nature, having within it a reinforcing ring of relatively rigid material spaced away from the edge of the diaphragm.

3. As an article of manufacture, a diaphragm of flexible material surrounded at its edge by a mounting ring of at least slightly yielding nature, having within it a reinforcing ring of relatively rigid material spaced away from the edge of the diaphragm and separated from such diaphragm edge by a portion of such yielding material.

4. As an article of manufacture, a diaphragm of flexible material, surrounded at its edge by a mounting ring of at least slightly yielding nature, and a reinforcing ring secured to such yielding material for reinforcing the same.

5. As an article of manufacture, a diaphragm of flexible material, surrounded at its edge by a mounting ring of at least slightly yielding nature, and a reinforcing ring of less elastic material embedded in such yielding material.

6. As an article of manufacture, a diaphragm of flexible material, surrounded at its edge by a mounting ring of at least slightly yielding nature, and a perforate reinforcing ring united to such yielding material by portions of such yielding material interlocked with the perforations of said ring.

7. As an article of manufacture, a diaphragm of flexible material surrounded at its edge by a mounting ring of at least slightly yielding nature, and a reinforcing ring of relatively rigid material united to such yielding material, a portion of such yielding material being superposed upon the outer side of such reinforcing ring, and acting as buffer material.

8. As an article of manufacture, a diaphragm of flexible material surrounded at its edge by a mounting ring of at least slightly yielding nature, extending from the edge of the diaphragm inward a short distance, and means for reinforcing that portion of the flexible material which is in immediate proximity to the edge of the diaphragm, whereby fluttering of the diaphragm is prevented.

9. As an article of manufacture, a mounting strip for forming mounting rings for diaphragms, comprising a strip of flexible and at least slightly yielding material having secured to it a reinforcing strip of relatively rigid material.

10. The combination with a diaphragm case, of a diaphragm therein having a substantially peripheral projecting rim and wedge members engaging such rim and so supporting the diaphragm throughout the periphery with an outward tensioning strain.

11. The combination with a diaphragm case, of a diaphragm therein having a substantially peripheral projecting rim and wedge rings engaging such rim and so supporting the diaphragm throughout the periphery with an outward tensioning strain.

12. The combination with a diaphragm case, of a diaphragm therein having a substantially peripheral projecting rim and wedge members engaging such rim and so supporting the diaphragm throughout the periphery with an outward tensioning strain, and means for moving one of said wedge members toward and from the diaphragm.

13. The combination with a diaphragm case, of a diaphragm therein having a substantially peripheral projecting rim and wedge rings engaging such rim and so supporting the diaphragm throughout the periphery with an outward tensioning strain, and means for moving one of said wedge rings toward and from the diaphragm.

14. The combination with a diaphragm case, of a diaphragm therein having a substantially peripheral projecting rim of slightly yielding nature, and wedge members engaging such rim and so supporting the diaphragm throughout the periphery with an outward tensioning strain, whereby the material of such rim may be placed under tension.

15. The combination with a diaphragm case, of a diaphragm therein having a substantially peripheral projecting rim, and means, engaging the inner surface of such rim, supporting the diaphragm within the case under peripheral outward tension.

In testimony whereof I have signed this specification in the presence of two subscribing witnesses.

HARRY M. MARBLE.

Witnesses:
MAY I. TRIMBLE,
PAUL H. FRANKE.

Copies of this patent may be obtained for five cents each, by addressing the "Commissioner of Patents, Washington, D. C."